Feb. 9, 1960       F. J. SHELL ET AL.       2,924,277
COMPOSITION COMPRISING CEMENT METHYL SILICONATE
SALT AND CELLULOSE ETHER METHOD OF MAKING
AND PROCESS OF EMPLOYING SAME
Filed March 25, 1954                3 Sheets-Sheet 3

INVENTORS.
Francis J. Shell
Robert D. Still
BY
Hudson & Young
ATTORNEYS

2,924,277

COMPOSITION COMPRISING CEMENT METHYL SILICONATE SALT AND CELLULOSE ETHER METHOD OF MAKING AND PROCESS OF EMPLOYING SAME

Francis J. Shell, Bartlesville, Okla., and Robert D. Still, Coffeyville, Kans., assignors to Phillips Petroleum Company, a corporation of Delaware Application March 25, 1954, Serial No. 418,700

10 Claims. (Cl. 166—33)

This invention relates to cements having retarded rates of hydration or set, to slurries of such cement, and to the method of making these slurries. The cement with which the invention is concerned is preferably a Portland or Portland-type cement. In another aspect it relates to any hydraulic cement composition in a dry form, or with added water in an aqueous slurry form, which when in the form of an aqueous slurry has a retarded initial set or extended or retarded thickening time and/or a reduced water-loss to adjacent porous formations, due to the addition of a minor but effective amount of a water soluble salt of a methyl siliconate together with a selected cellulose derivative, this invention relating first to said compositions of matter, second to processes of compounding said compositions, and third to processes for using said compositions in the arts of cementing wells, sealing porous formations during the drilling of wells, cementing casings in the well, squeeze cementing, plugging the well or the earth formation adjacent the same, and grouting or sealing crevices, cracks or holes in man-made formations, such as buildings, foundations, dams, breakwaters or concrete and masonry structures, in some instances the cracks or fractures already existing before the slurry is pumped into them, and in some cases the pressure of the slurry being pumped into or against the surface of said formation or structure forming by its pressure the cracks or fractures to be filled. In another aspect, this invention relates to a light weight cement incorporating diatomaceous earth as a weight-reducing agent together with selected cellulose derivatives and the aforesaid water soluble salt of a methyl siliconate.

Among the objects of the invention is the provision of a cement having a retarded rate of hydration, or retarded set, as it will be hereinafter termed, particularly at elevated temperatures up to and above 300° F. and/or at high pressures up to and above 20,000 pounds per square inch, such as are encountered in cementing of deep wells.

One object of the present invention is to provide a suitable hydraulic cement aqueous slurry, and suitable processes employing the same, for cementing casing in wells, for squeeze cementing in wells, and for grouting cracks, fractures or voids, in natural formations, such as in wells, or in man-made formations such as dams, breakwaters, walls and massive foundations and structures of all types.

Another object of this invention is to provide a dry hydraulic cement powder which is a novel composition of matter, and which may be mixed with water to form an aqueous cement slurry which is a novel composition of matter and which has at least one of the following useful properties: a relatively retarded time of initial set, a relatively extended thickening time during which it is pumpable, and/or a relatively low water-loss to porous formations with which it may come in contact during cementing or grouting operations.

Further objects of the invention reside in the provision of a slurry of the above cement, and in a method of making such slurry.

These and further objects of the invention will be more readily apparent in the following description.

In the cementing of oil wells it is customary to mix a hydraulic cement, for example a Portland or Portland-type cement, with the requisite amount of water to form a pumpable neat slurry, and to pump the mixture into the well and down the hole into the place where it is desired to have it harden. In present oil well drilling practice, with wells commonly ranging from 6,000 to 12,000 feet or more in depth, high temperatures are encountered at the locations which are to be cemented, and relatively long periods of time are often required to pump the slurry into place. Furthermore, in the customary practice of pumping the cement slurry down through the casing and either forcing it out the bottom of the casing and upward around the outer surface of the casing, or through perforations in the lower end of the casing into the formation sought to be sealed, the slurry is required to pass through narrow channels and small openings. Successful placement of the slurry, therefore, requires that the slurry shall remain fluid and pumpable at high temperatures for several hours before it begins to harden. However, after the slurry has been pumped into place, it is desirable to have the hydration or set proceed at a rate at which the slurry will attain its final set and develop considerable strength within a reasonable time, say within a few days. It would be even more desirable to have it attain its final set in about 24 hours but often this is not attainable.

As pointed out in the preceding paragraph, the most important function of the hydraulic cement aqueous slurry of the present invention is that it has a retarded time of initial set, and therefore remains pumpable for a relatively long period of time and a relatively long period of time passes before it thickens, yet it will attain a final set of some considerable strength within a reasonable length of time so that the well-drilling crew is not unduly delayed, but can get back to work and proceed to continue drilling the well bore, or to perforate the casing and/or cement with the usual gun perforating tools known to the art. All types of the agents hereafter named, in suitable combination, have sufficient set retarding and thickening time extending properties when added to hydraulic cement aqueous slurries to be used commercially in the practice of the present invention. A secondary effect is achieved, which is also of considerable value in cementing oil wells, namely, the aqueous cement slurry containing the minor but effective amount of one of said named agents has a reduced tendency to lose water to porous formations across the surface of which it must pass in going to its intended position in the well. Many failures in prior art oil well cementing jobs, which have been accredited to the premature setting of the cement, are thought to be caused actually by the formation dehydrating the cement slurry, thereby rendering the cement immobile before it reaches the desired position. As the practice of using scrapers to clean the mud off the well walls to obtain a better cement-formation bond becomes more frequently used, the better the formations will absorb the water from the cement slurry causing it not only to plug the annulus between the casing and the wall of the well, but also to have insufficient water for normal hydration upon setting, and the greater will become the realization of the need for low water-loss cements.

Everything which is said applying to natural formations in wells applies also in some degree to man-made formations being grouted, and the word "formation" as used herein is regarded as generic to natural earth formations, geological formations, and man-made formations such as structures.

In the prior art of squeeze cementing in wells and in forcing grout into the cracks and crevices in fractured foundations or the like, it has been the practice to employ as a breakdown liquid, water, or drilling mud, which is forced ahead of the aqueous hydraulic cement slurry into the formation to split the same and enlarge the fractures or cracks to be filled, because if ordinary hydraulic cement aqueous slurry were employed it would lose water to the formation or foundation so rapidly that the cement slurry would start to set before much penetration has been effected. When a relatively low water-loss hydraulic cement aqueous slurry is employed, the amount of breakdown liquid can be greatly reduced, or entirely eliminated, because the low water-loss cement slurry will penetrate to much greater distances before losing sufficient water to be caused to set by this dehydration. When squeeze cementing in oil wells is involved, in which it is desired to force a thin disk or layer of these cement slurries out into a natural earth formation along pre-existing or pressure-made fractures, in order to separate an oil sand from some other sand at the general vicinity where the oil well intersects the same, it is especially advantageous to use a relatively low water-loss cement slurry as breakdown agent because then less water is likely to be absorbed by the oil formation where it might cause a reduction in the present or future amount of production of oil. Some oil-bearing formations contain bentonitic materials which swell when they encounter water, and if excess water is injected into such formations, the swelling of the bentonitic material may prevent future production of oil.

Figure 1:
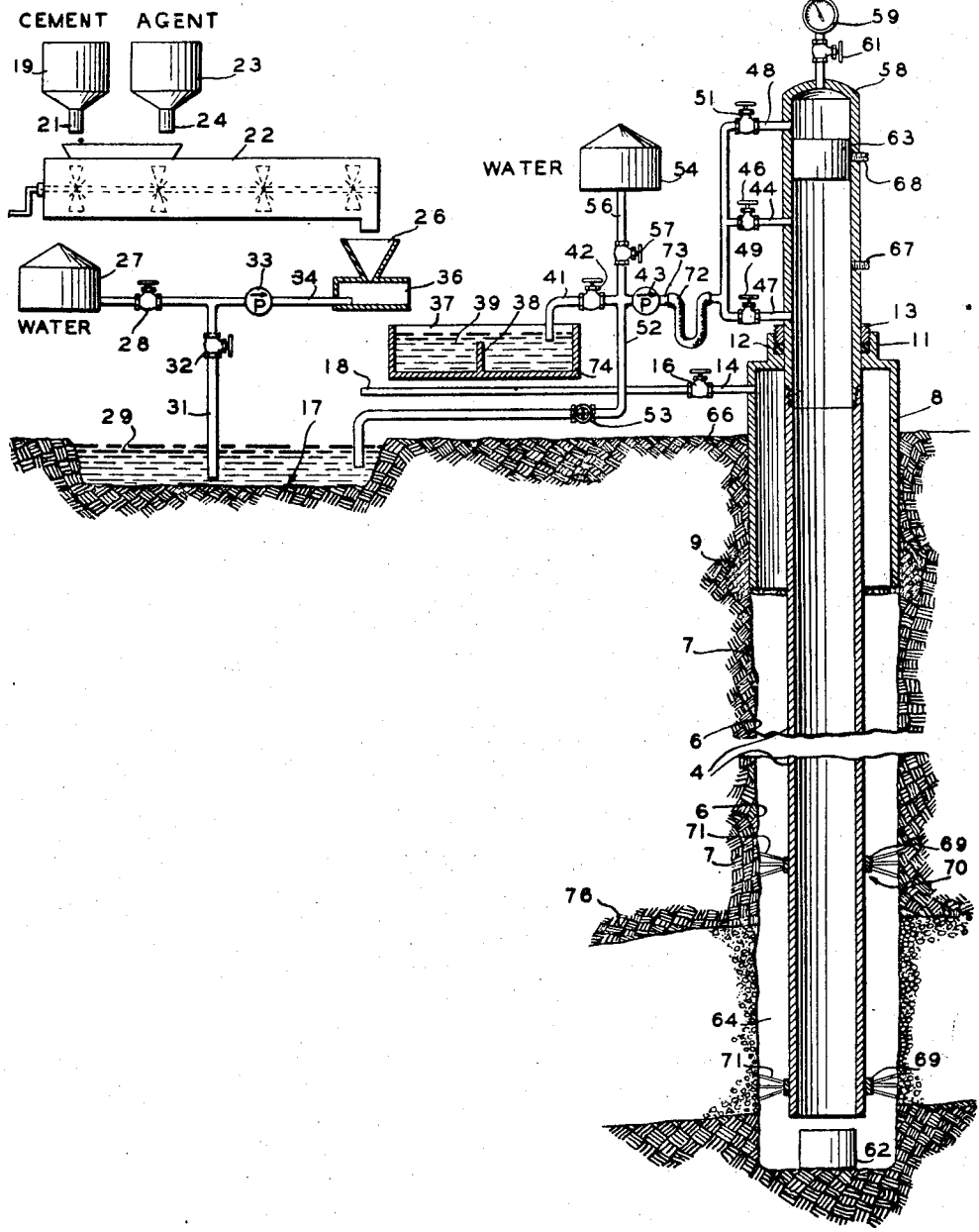
Figure 1 is an elevational view with parts in section of apparatus suitable to carry out the processes of the present invention in compounding the hydraulic cement aqueous slurry and cementing a casing in a well, or grouting a formation.

Figure 1 illustrates some of the processes devised by the present invention for cementing a casing 4 in a well 6 drilled in formation 7, or for grouting cracks or crevices in formation 7, it being understood that formation 7, instead of being a natural geological formation, may be a man-made formation such as a foundation, dam, breakwater, or other concrete or masonry structure. While casing 4 could be placed in the open bore 6 of the well, and the circulated drilling mud, hydraulic cement aqueous slurry, or other fluids in the bore 6 could be allowed to emerge around pipe 4 onto the surface of the formation 7 from the uncased bore 6, it is preferred to have at least one casing, soil pipe, or other pipe 8 secured in sealing contact with formation 7, either by close fit or by previous cementing 9. The pipe 8 is provided with a casing head 11 having a stuffing box or packing 12 forced into sealing contact with casing 4 by some sort of follower 13. Casing head 11 also is provided with an outlet pipe 14 which is preferably controlled by a valve 16 and which may discharge into a mud pit generally designated as 17 through pipe 18.

A suitable amount of a suitable grade of hydraulic cement, such as Portland cement, is fed from bin 19 through valve 21 into mixer 22 and a minor but effective amount of one or more of said named agents, say from 0.30 to 5 percent by weight of the dry hydraulic cement, for example, 0.5 percent by weight, is also fed into mixer 22 from the bin 23 controlled by valve 24. Of course this mixing in mixer 22 need not occur anywhere near the well, but could have taken place any number of miles away and several months before, and then the ready-mixed cement composition brought to the well in sacks (not shown) or in a bulk cement truck (not shown). In any event the dry cement composition from mixer 22, or from cement sacks (not shown), is dumped into hopper 26 where it is picked up and mixed with a jet of water from tank 27 controlled by valve 28, or with a jet of drilling mud 29 from mud pit 17 through pipe 31 controlled by valve 32, the selected liquid being forced by pump 33 through jet pipe 34. The jet of liquid from 34 picks up and mixes with the dry cement from hopper 26 and discharges the same out opening 36, which could connect directly to casing 4. To insure thorough mixing, allow for inspection, and act as a surge reservoir, a suitable reservoir 37 is generally provided and we have found it useful to have a baffle in the same, over which the hydraulic cement aqueous slurry flows, and is then picked up by pipe 41 controlled by valve 42 from which it may be pumped by pump 43 into casing 4 through pipe 44 controlled by valve 46. Pipes 47 and 48 controlled by valves 49 and 51, respectively, are both reserved for drilling mud 29 from mud pit 17, drawn through pipe 52 controlled by valve 53 when desired, or water from tank 54 drawn through pipe 56 controlled by valve 57 when desired.

Casing 4 obviously generally consists of a number of pipes screwed together to form a single pipe and at its upper end it is provided with some type of casing head 58. While not essential, it is useful to have a pressure gauge 59 connected at some point in the system. The pressure gauge can be cut off by valve 61.

While casing 4 could be cemented without the use of plugs 62 and 63 simply by opening valves 16, 42, and 49, and pumping the hydraulic cement aqueous slurry with pump 43 down inside of casing 4, out the end thereof and up around the annular space 64 between bore 6 and casing 4 on to the ground surface 66 around casing 4 (if no soil pipe 8 is employed) this would not produce the best type of cementing available as the interior of the casing 4 would be full of cement which would have to be drilled out, and no pump pressure could be placed on the slurry. Whether soil pipe 8 is present for pressure control or not, it is possible, when desired in the process, to close valve 42 and open either valve 53 or 57 and follow the cement with water 54 or drilling mud 29, and by counting the strokes of the pump and stopping the same and closing valve 49 at the proper time to stop the cement water interface before the drilling mud or water comes out the bottom of casing 4, and thus cement without plugs 62 and 63 and still have casing 4 almost free of cement. By providing soil pipe 8, casing head 11, flow line 18, valve 16 and casing head 58, it is easy to place pressure on the slurry by throttling or closing valve 16 when desired.

The two plug method illustrated, however, is preferred. Starting with plug 62 secured in casing head 58 between pipes 44 and 47 by set screw 67 and plug 63 held as shown with set screws 68 and all of valves 42, 53, 57, 51, 46, 49 and 16 closed, it is usual to first wash the annular space 64 of well bore 6 with either drilling mud 29 or water 54, in most cases drilling mud 29 being preferred, and to do so valves 53 and 57 are opened, depending on whether drilling mud 29 or water is used, valve 16 is opened and valve 49 is opened and pump 43 is started, pumping the drilling mud (or water) through casing 4 up through annular space 64 and out through pipe 18. At the same time casing 4 may be moved up and down through stuffing box 11, packing 12 being loosened by loosening follower 13, and casing 4 may, if desired, have secured thereto wall scraper elements generally designated as 70 which may comprise annular rings 69 secured to casing 4, mounting more or less radial wire bristles, rods or strips 71 which scrape the drilling mud cake off the walls of well bore 6 in order to provide a good bond between the formation 7, the well, and casing 4. Any number of scrapers 69 may be provided and the movement of casing 4 may be great enough so that the scraping of one set of scrapers 69 will overlap the scraping of the next adjacent set, and to allow this movement a flexible section of pipe 72 may be provided in the line 73 from pump 43.

When the washing of the well and cleaning of the wells is sufficiently accomplished, pump 43 is stopped, and whichever of valves 53 and 57 are opened is closed. The casing 4 at that time is spaced from the bottom of the hole 6 a distance less than the length of plug 62 plus a portion of the length of plug 63 but greater than the length of plug 62. Follower 13 of stuffing box 11 is adjusted to seal at 12 around casing 4. Valves 16, 42 and 46 are open and set screw 67 is screwed away, releasing plug 62, and pump 43 is started, pumping hydraulic cement aqueous slurry from sump 74 of reservoir 37 into the space between plugs 62 and 63, forcing plug 62 down casing 4 and out the end thereof into the position shown. The cement forces the plug out the end of casing 4 and proceeds up the annulus 64 forcing the mud or water ahead of it up annulus 64 and in doing so it may have to traverse an especially porous formation 76 which will take the water away from the aqueous slurry in the absence of said named agent 23, especially if the drilling mud has been scraped from the surface of formation 76 by the scrapers 71. When the hydraulic cement aqueous slurry commences emerging from pipe 18, or when it is believed that it would emerge from pipe 18 or would reach the desired elevation in annulus 64 as soon as casing 4 were cleared of cement, depending on the type of cementing job desired, then valve 51 and one of valves 53 or 57 are opened, set screw 68 is loosened, and valves 42 and 46 are closed, whereupon the water (or drilling mud) passes through pipe 48 into casing head 58, moving plug 63 down the casing 4 until plug 63 rests on top of plug 62 but is unable to come out of the bottom of the casing and therefore plugs the end of casing 4, whereupon the pressure (as indicated by gauge 59) goes up as an indication of what has happened, valve 51 is closed and pump 43 shut down, leaving the annular space 64 full of cement and the inside of casing 4 full of water or drilling mud.

Any time during the entire pumping process from the time the cement reaches 76 until plug 63 seats on plug 62 that it is desired to drive the hydraulic cement acqueous slurry into the more porous portions of the formation, such as formation 76, it is only necessary to throttle pipe 18 by partially closing valve 16, or, if desired, to close valve 16 completely for the desired time, which action will send up the pressure in the system to the desired degree and force cement slurry into formation 76 if it will take the same at the pressure.

The U.S. patents now in class 166, Wells, subclass 22, Cementing or Plugging, disclose a number of other suitable cementing processes which may be employed in my invention.

Figure 2:
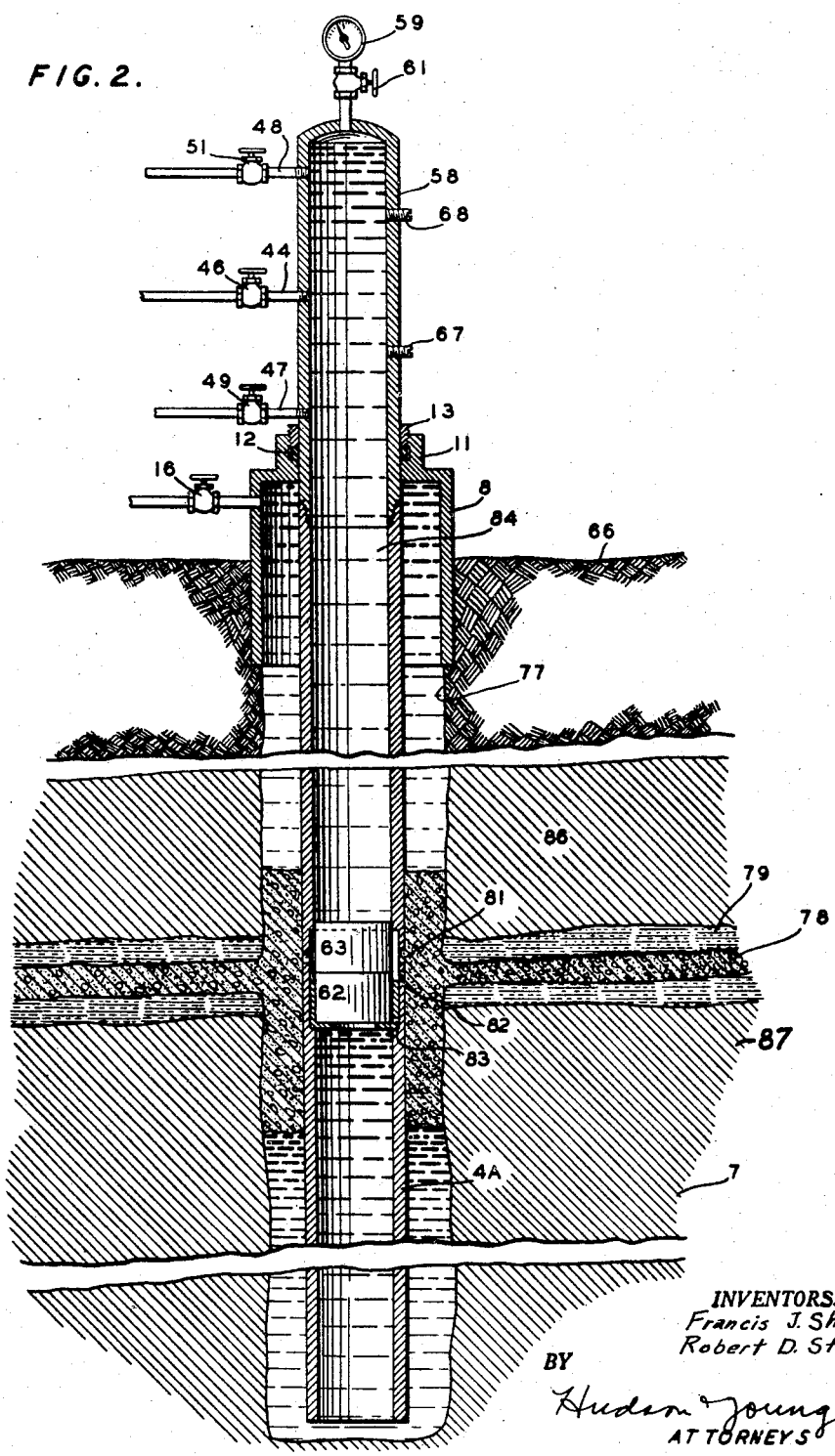
Figure 2 is a cross sectional view of a portion of a well in which squeeze cementing is being employed to place a cementitious horizontal dam out into the surrounding formation.

Figure 2 is illustrative of a well 77 similar to well 6 and equipped with similar equipment in which a squeeze-cementing job is employed to place a cementitious horizontal dam 78 out into the surrounding formation 79. As will be noted by the use of similar numbers, the equipment at the top of the well is all the same as in Figure 1 and is operated in the same manner. Casing 4A differs from casing 4 somewhat, in that the intermediate portion of casing 4A is provided with a number of radial holes 81 which holes are at first covered by sleeve 83 held in place by frangible pin 82. When plug 62 comes down the casing 4A ahead of the cement it catches in sleeve 83, breaks frangible pin 82 and opens openings 81 to cement. This causes a jump of the indicator needle of gauge 59 and at that time valve 16 can be closed for as long a period of time as desired so that cement 78 can be forced away out into formation 79. When plug 63, which is followed by liquid 84 which may be water 54 or drilling mud 29, reaches the top of plug 62 it plugs the interior of casing 4A, closing the holes 81. Incidentally, in both Figures 1 and 2, plugs 62 and 63 are preferably made of wood, or some easily drillable plastic composition, and preferably sleeve 83 is made of some drillable material, such as aluminum or magnesium, so that after cement dike 78 has set, the casing 4A can be drilled out to its original diameter and drilling or other desired operations carried out through the same.

In Figure 2 the formations 86 and 87 may be more impervious than formation 79, and the crack into which cement 78 is forced may have originally been formed by the pressure on the aqueous slurry of pump 43 with valve 16 closed, in which case formation 86 and all overlying formations are raised or compressed enough to make room for cement 78. These formations 86, 87 and 79 may all be man-made, such as layers of earth, concrete or masonry, as in a big dam or other foundation.

Figure 3:
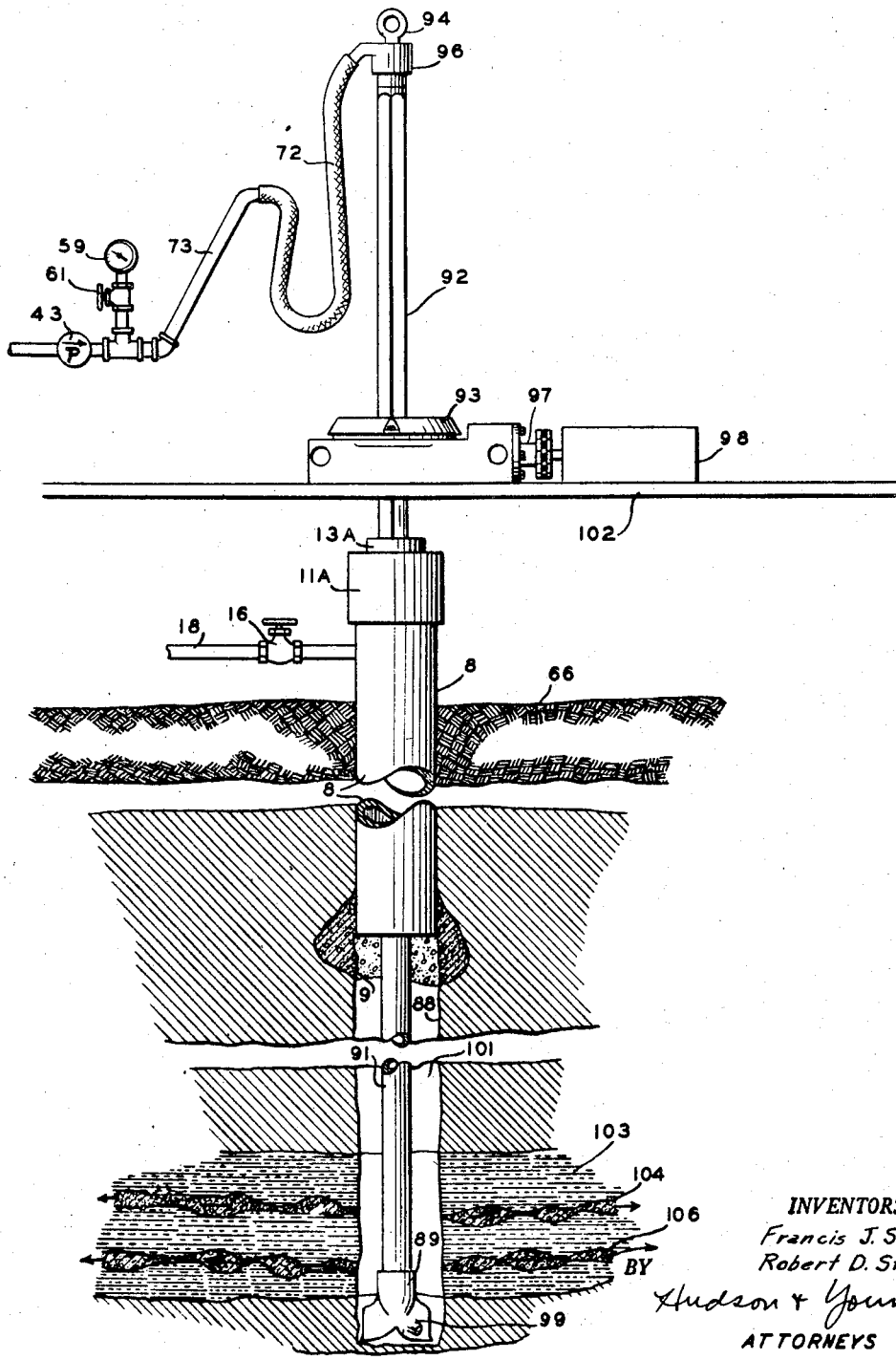
Figure 3 is a cross sectional view of a portion of a well in which a porous formation is plugged to prevent loss of circulation while drilling.

In Figure 3 is illustrated rotary drilling operations in which a well 88 is being drilled with a fishtail bit 89 rotated at the end of a drill string 91. Drill string 91 has a square section 92 known as a Kelly which is slideably and rotatably engaged with a square hole or bushing in rotary table 93, the drill bit being supported from eye 94 of rotary swivel 96 by means of a hoisting tackle (not shown) and rotary table 93 is rotated through gear 97 driven by motor 98. At the same time pump 43 is pumping drilling mud 29 (see Figure 1) through pipe 73, flexible section 72 and rotary swivel 96 down the inside of Kelly 92 and drill string 91 and out of the jet hole of bit 89, returning through annular space 101 through soil pipe 8, valve 16 and pipe 18 into mud pit 17. Soil pipe 8 is provided with a stuffing box 11A, which because the Kelly is square has to have a rotatable portion 13A slideably packing against the square sides of Kelly 92. Such equipment is well known in the art of drilling wells, as shown by U.S. patents in class 166, Wells, subclass 15, Controllers; and class 255, Earth Boring, subclass 19A, Rotary, Blowout Preventers.

Motor 98 and rotary table 93 are supported by floor 102 of the usual rotary well drilling rig, the remainder of which drilling rig is not shown but is well known to those skilled in the art.

When rotary drilling, sometimes a cavernous formation 103 is encountered, containing passages 104 and 106, which may have an apparently unlimited capacity for taking up drilling mud in the direction shown by the arrows. When such a formation is encountered, instead of directing ordinary drilling mud 29 in through pipe 52 and pumping the same down drill string 91 with pump 42, valve 53 is closed (see Figure 1) and valve 32 is opened, pump 33 is started, valve 28 being closed, and drilling mud is jetted through 34 and mixed with hydraulic cement containing one of said named agents which is discharged as a hydraulic cement aqueous mud containing slurry into 39 from which it is picked up by pipe 41, valve 42 being open, and valves 53 and 57 closed, by pump 43 and pumped down drill string 91. At this time valve 16 may be closed to increase the pressure forcing the slurry back into caverns 104 and 106, but closing valve 16 may be unnecessary if caverns 104 and 106 are already taking the drilling mud completely. Whenever the operator, because of rising pressure or the returning of slurries through pipe 18, decides that caverns 104 and 106 are shut off and circulation has been restored, valve 42 is closed and valve 53 is opened, valve 16 now being opened, and the rotary drilling continues in the usual manner with drilling mud 39 from mud pit 17 washing the remains of the cement containing mud out of bore 101 and pipe 18. Obviously the pump 33 is shut down as soon as slurry 29 is no longer needed, and pipe 18 can be deflected to another mud pit or dumping place (not shown) to avoid the cementitious mud returning to mud pit 17, until cement free mud returns, and then it can be deflected back to mud pit 17. These formations being drilled may be man-made as in a dam, or may be natural formations encountered as in oil well drilling.

By hydraulic cement this invention intends to include all mixtures of lime, silica, and alumina, or of lime and magnesia, silica and alumina, and iron oxide (magnesia for example may replace part of the lime, and iron oxide a part of the alumina), as are commonly known as hydraulic cements. Hydraulic cements include hydraulic limes, grappier cements, pozzolan cements, natural cements, calcium sulfate or gypsum cements (such as plaster of Paris) and Portland cements. Pozzolan cements include slag cements made from slaked lime and granulated blast furnace slag. Because of its superior strength Portland cement is preferred among the hydraulic cements, but as the art of cements recognizes hydraulic cements as a definite class, and as results of value may be obtained with one of said named agents with any member of that class, it is desired to claim all hydraulic cements. In addition to the ordinary construction grades of Portland cement or other hydraulic cements, modified hydraulic cements and Portland cements designated as high-early-strength cement, heat-resistant cement, and slow-setting cement may be used in the present invention.

In accordance with the invention, a suitable cement for oil well cementing and grouting operations can be prepared by addition to the cement of from 0.06 to 2.0 percent by weight of a water soluble salt of a methyl siliconate in combination with 0.2 to 10.0 percent of methyl cellulose or carboxy-methyl hydroxy-ethyl cellulose. However, outstanding advantages of the invention are obtained with light weight cement containing 1 to 60 percent of a suitable weight-reducing agent, such as diatomaceous earth, one particularly suitable diatomaceous earth being Celite. With such cements, containing diatomaceous earth, the cellulose derivatives methyl cellulose and carboxy-methyl hydroxy-ethyl cellulose give outstanding results. If the carboxy-methyl hydroxy-ethyl cellulose is used, the total substitution should be between 0.5 and 1.75, preferably about 1.0 substituent group per cellulose unit. The degree of substitution of the hydroxyethyl groups can vary between 0.35 and 1.35 substituent group per cellulose unit, preferably 0.7, and the degree of substitution of the carboxy-methyl groups can vary between 0.15 and 1.2, preferably 0.3. Therefore, in the preferred embodiment, the number of carboxy-methyl groups is generally equal to about half of the number of hydroxy-ethyl groups of the cellulose molecule.

As stated, any water soluble salts of the methyl siliconate compounds are suitable. The preferred salt is the sodium salt, i.e., sodium methyl siliconate, due to its lower cost and commercial availability. The other alkali metal salts are very suitable however and include the potassium salts, and materials such as lithium, rubidium, and caesium, or the ammonium or organic base salts of one of the methyl siliconates which are water soluble. Typical organic base salts which can be used are those derived from ammonia such as methylamine, dimethylamine and ordinary ammonium bases; also pyridine, morpholine and the like. In addition, the alkaline earth metal salts such as barium, calcium, strontium and magnesium, and the heavy metal salts such as the aluminum, iron, copper, lead, silver, mercury, nickel, and all other salts which are soluble in water or hydrolyzed in a hydraulic cement aqueous slurry are useful in this invention where the aqueous hydraulic cement slurry is quite alkaline.

The amount of water added to the cement of the present invention is not critical, it being obvious that sufficient water should be added to form a pumpable slurry, and that when the slurry becomes pumpable no further water need be added. One advantage of the slurry of the present invention when one of said named agents is used is that it is a low water-loss slurry, and therefore it is not necessary to add much excess water over the amount making the slurry pumpable as a reserve for expected losses, which excess water might tend to reduce the final compressive strength of the cement.

As previously noted, where the cement contains Celite as a weight-reducing agent together with one of the specified cellulose derivatives and a water soluble methyl siliconate, the resulting cement slurry has a light weight together with a low water loss. Further, it is easy to mix, and the thickening time is not excessive.

In particular, it has been found heretofore that, when Celite or diatomaceous earth is added to cement, the amount of water loss reducing agent must be increased in order to hold the water loss within prescribed limits. However, when carboxy-methyl hydroxy-ethyl cellulose is added to the cement in addition to the Celite, the setting time of the cement is far too great. The addition of other accelerator agents to cut down the loss of setting time has been found, in general, to destroy or counteract the desirable effects of the carboxy-methyl hydroxy-ethyl cellulose in reducing the water loss. However, unexpectedly, where the additional accelerating agent is a water soluble salt of a methyl siliconate, the setting time is reduced without destroying the beneficial effect of the water loss reducing agent.

When methyl cellulose, an accelerator, is used as a water loss control agent in a Celite-containing cement, the water soluble salt of a methyl siliconate provides a retarded setting time without destroying the effectiveness of the methyl cellulose in preventing water loss.

SPECIFIC EXAMPLES

In the specific examples set forth in the following table, the ingredients were mixed in the proportions indicated and subjected to thickening tests in a Halliburton thickening time tester at 180° F. according to the procedure described in API code 32, section XII (9). The time indicated is that at which the slurry was no longer pumpable. The cements were also tested for water-loss according to the procedure set forth in API code 29 for drilling muds. This test measures the milliliters of filtrate that can be forced through a standard filter paper by a 100 lb./in.$^2$ gauge pressure differential, which has been found to be a very good indication of what water would be lost from an aqueous cement slurry to an exposed porous sand formation in an oil well.

*Table*

| Portland Cement Brand | Wt. Percent Sodium Methyl Siliconate | Cellulose Derivative | Percent | Percent Celite | Percent Water | Initial Water Loss | Water Loss after 0.5 hr. | Water Loss after 1 hr. | Thickening Time, Hours, and Minutes | Wt./gal. (Pounds) |
|---|---|---|---|---|---|---|---|---|---|---|
| Dewey | | | | 0 | 54 | 515 | | | 0:48 | 15.0 |
| Do | 0.3 | | | 0 | 54 | 258 | | | 0:04 | 15.0 |
| Do | | | | 20 | 140 | 390 | | | 1:51 | 11.7 |
| Do | 0.3 | | | 20 | 140 | 600 | | | Short | 11.7 |
| Do | | Methyl | 1.5 | 20 | 140 | 66 | 17 | | 0:41 | 11.7 |
| Do | 0.3 | Methyl | 1.5 | 20 | 140 | 35 | | | 10:08 | 11.7 |
| Do | 0.4 | Carboxymethyl hydroxyethyl | 1.5 | 20 | 140 | 6 | 7 | 9 | 53:25 | |

From the foregoing table, it will be evident that cement prepared from a water-soluble salt of a methyl siliconate, celite and methyl cellulose or carboxy-methyl hydroxyethyl cellulose exhibit the desirable characteristics of low weight, low water loss, and a desirable setting time, which is not true where the named ingredients are used individually or in other combinations.

While the invention has been described in connection with a present, preferred embodiment thereof, it is to be understood that this description is illustrative only and is not intended to limit the invention.

We claim:

1. A cement capable of forming a fluid slurry when mixed with water comprising a hydraulic cement, 0.2 to 10 percent by weight based on said cement of a carbohydrate derivative selected from the group consisting of corboxy-methyl hydroxy-ethyl cellulose and methyl cellulose, and 0.6 to 2.0 percent by weight based on said cement of a water soluble salt of a methyl siliconate.

2. A cement capable of forming a fluid slurry when mixed with water comprising a Portland cement, 0.2 to 10 percent by weight based on said cement of a carbohydrate derivative selected from the group consisting of carboxy-methyl hydroxy-ethyl cellulose and methyl cellulose, and 0.6 to 2.0 percent by weight based on said cement of a water soluble salt of a methyl siliconate.

3. A light-weight cement capable of forming a fluid slurry when mixed with water, comprising Portland cement, 0.2 to 10.0 percent of a carbohydrate derivative selected from the group consisting of carboxy-methyl hydroxy-ethyl cellulose and methyl cellulose, 1 to 60 percent diatomaceous earth, and 0.06 to 2.0 percent of a water soluble salt of a methyl siliconate, where each said percent is defined as percent by weight of said cement.

4. A cement in accordance with claim 3 in which said water soluble salt is sodium methyl siliconate.

5. A cement in accordance with claim 3 in which the alkali metal siliconate is potassium methyl siliconate.

6. A method of cementing a casing in a well which comprises pumping down through the casing an aqueous hydraulic cement slurry containing 0.2 to 10 percent by weight based on said hydraulic cement of a carbohydrate derivative selected from the group consisting of carboxy-methyl hydroxy-ethyl cellulose and methyl cellulose, and 0.06 to 2.0 percent by weight based on said hydraulic cement of a water soluble salt of a methyl siliconate.

7. A method of cementing a casing in a well which comprises pumping down through the casing an aqueous hydraulic cement slurry incorporating 0.2 to 10 percent by weight based on said hydraulic cement of a carbohydrate derivative selected from the group consisting of carboxy-methyl hydroxy-ethyl cellulose and methyl cellulose, 1 to 60 percent by weight based on said hydraulic cement of diatomaceous earth, and 0.06 to 2.0 percent by weight based on said hydraulic cement of an alkali metal methyl siliconate.

8. The process of producing a hydraulic cement aqueous slurry having an extended time of set which comprises admixing with hydraulic cement from 0.2 to 10 percent by weight of a carbohydrate derivative selected from the group consisting of carboxy-methyl hydroxy-ethyl cellulose and methyl cellulose, 0.06 to 2.0 precent by weight of an alkali metal methyl siliconate, and 1 to 60 percent by weight of diatomaceous earth, and mixing therewith sufficient water to produce a fluid slurry.

9. The process of cementing a hole which extends into a formation which comprises admixing with hydraulic cement from 0.2 to 10 percent by weight based on said hydraulic cement of a carbohydrate derivative selected from the group consisting of carboxy-methyl hydroxy-ethyl cellulose and methyl cellulose, 1 to 60 percent by weight based on said hydraulic cement of diatomaceous earth, and 0.06 to 2.0 percent by weight based on said hydraulic cement of an alkali metal siliconate, mixing therewith sufficient water to produce a fluid hydraulic cement aqueous slurry having an extended thickening time, and introducing said slurry into said hole into contact with said formation.

10. The process of cementing a well which extends into a formation which comprises admixing with hydraulic cement from 0.2 to 10 percent by weight based on said hydraulic cement of a carbohydrate derivative selected from the group consisting of carboxy-methyl hydroxy-ethyl cellulose and methyl cellulose, 1 to 60 percent by weight based on said hydraulic cement of diatomaceous earth, and 0.06 to 2.0 percent by weight based on said hydraulic cement of an alkali metal methyl siliconate, mixing therewith sufficient water to produce a fluid hydraulic cement aqueous slurry having an extended thickening time, and introducing said slurry into said hole into contact with said formation.

References Cited in the file of this patent

UNITED STATES PATENTS

| | | |
|---|---|---|
| 2,198,120 | Lerch et al. | Apr. 23, 1940 |
| 2,360,518 | Scripture | Oct. 17, 1944 |
| 2,427,683 | Ludwig | Sept. 23, 1947 |
| 2,491,487 | Faulwetter | Dec. 20, 1949 |
| 2,549,507 | Morgan et al. | Apr. 17, 1951 |
| 2,654,674 | Frankenhoff | Oct. 6, 1953 |
| 2,813,085 | MacMullen et al. | Nov. 12, 1957 |

FOREIGN PATENTS

| | | |
|---|---|---|
| 675,188 | Great Britain | July 9, 1952 |
| 701,668 | Great Britain | Dec. 30, 1953 |